July 19, 1966  A. W. GARDES  3,262,110
ELECTRIC TIMER PROVIDED WITH BUZZER CONSTRUCTION
Filed Aug. 12, 1963  2 Sheets-Sheet 1

INVENTOR.
ALFRED W. GARDES
BY Robert R. Lockwood
Atty.

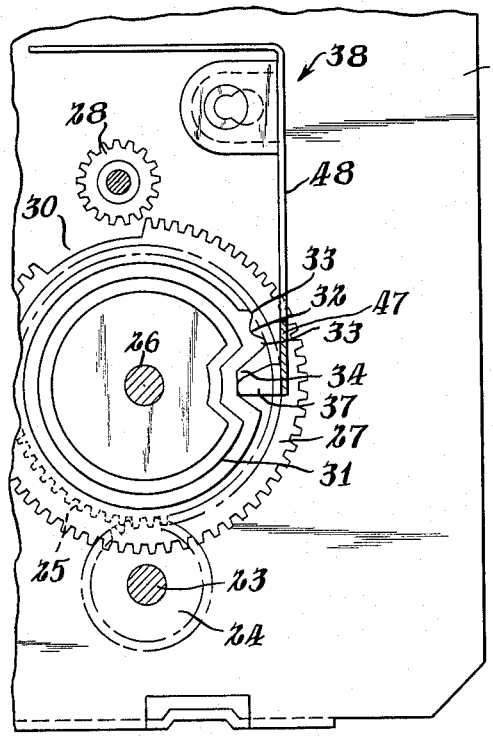
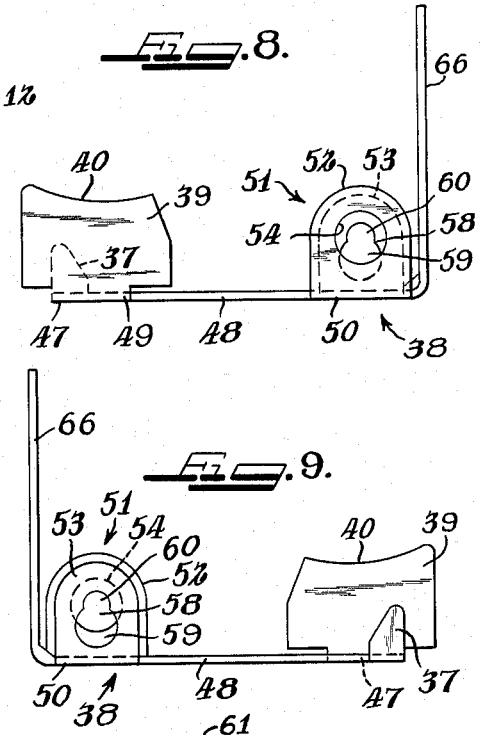
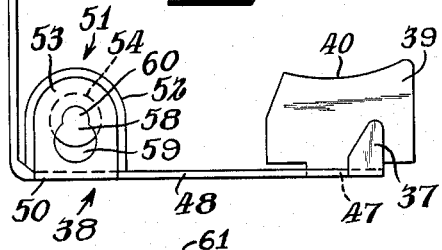
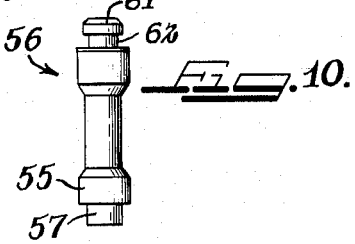
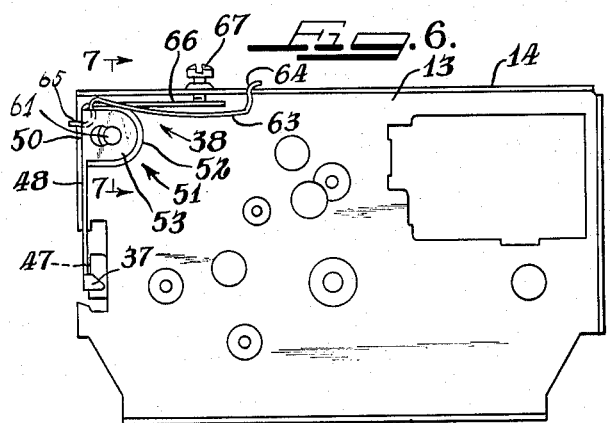
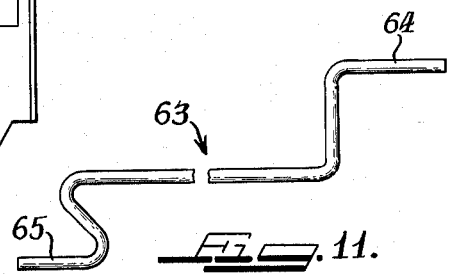
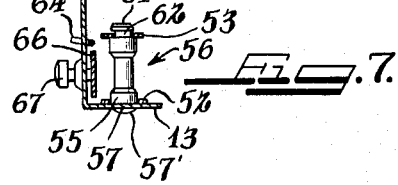

United States Patent Office 3,262,110
Patented July 19, 1966

3,262,110
ELECTRIC TIMER PROVIDED WITH BUZZER CONSTRUCTION
Alfred W. Gardes, Evanston, Ill., assignor to International Register Company, Chicago, Ill., a corporation of Illinois
Filed Aug. 12, 1963, Ser. No. 301,464
6 Claims. (Cl. 340—392)

This invention relates, generally, to electromagnetic devices and it has particular relation to audible electric buzzers. It constitutes an improvement over the construction shown in U.S. Patent No. 2,681,444, issued June 15, 1954, to W. P. Gallagher and U.S. Patent No. 3,098,131, issued July 16, 1963, to W. P. Gallagher et al.

Among the objects of this invention are: To provide a buzzer construction for use in conjunction with the magnetic field structure of an electric motor energized by alternating current that is simple and efficient in operation, has relatively long life, and can be readily and economically manufactured and installed; to provide a pivotal mounting for a buzzer member that is substantially unaffected by wear resulting from operation of the buzzer under normal operating conditions; to mount the buzzer member on a stud at spaced locations therealong in such manner that it is merely guided at one location and is pivoted principally at the other location; to employ a U-shaped yoke for mounting on the stud with one arm having a clearance opening for guiding on one end of the stud and the other arm having a journal opening fitting fairly closely with the other end of the stud and providing the principal bearing for the buzzer member; to support the stud only at one end on a rear frame plate on which the motor is mounted with the other end of the stud free and not mounted on an adjacent front frame plate whereby relative movement between the frame plates has no effect on the position of the stud and consequently no effect on the adjustment of the buzzer member; to provide for adjusting the buzzer member to position the hammer carried thereby in predetermined relation to a hammer contacting part of the magnetic field structure for normal buzzer operation; to form the buzzer member with a tongue extending from the U-shaped yoke in underlying relation to a wall integral with the rear frame plate; and to provide the adjustment of the buzzer for proper operating conditions by a screw threaded through the wall and bearing against the tongue which is biased into engagement with the screw.

In the drawings:

FIG. 5 is a vertical sectional view taken generally along the line 5—5 of FIG. 3 to show a part of the interval timer portion of the range timer.

FIG. 6 is a view, in front elevation, of the rear frame plate with the buzzer member mounted thereon.

FIG. 7 is a vertical sectional view taken generally along the line 7—7 of FIG. 6.

FIG. 8 is a view, in side elevation and at an enlarged scale, of the buzzer member.

FIG. 9 is a view of the buzzer member shown in FIG. 8 taken from the opposite side.

FIG. 10 is a view, at an enlarged scale, of the support stud on which the buzzer member is mounted.

FIG. 11 is a view of the spring wire, at an enlarged scale, that is employed for biasing the buzzer member.

Figure 1:
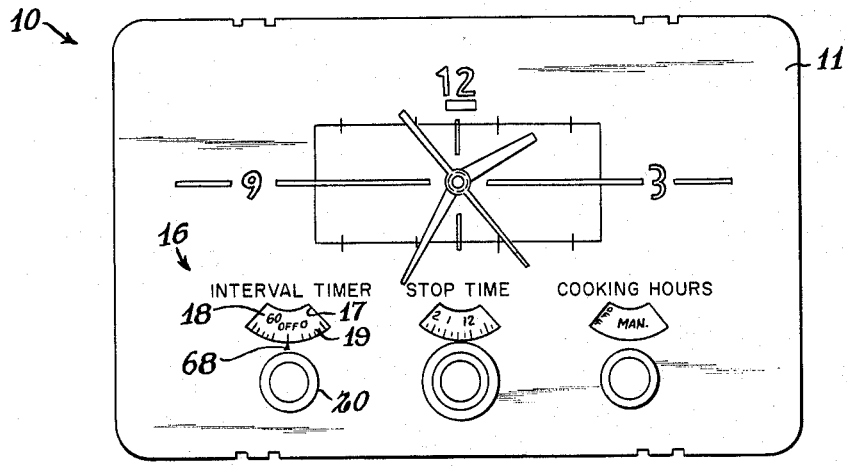
FIG. 1 is a view, in front elevation, of a range timer embodying the present invention.
Figure 2:
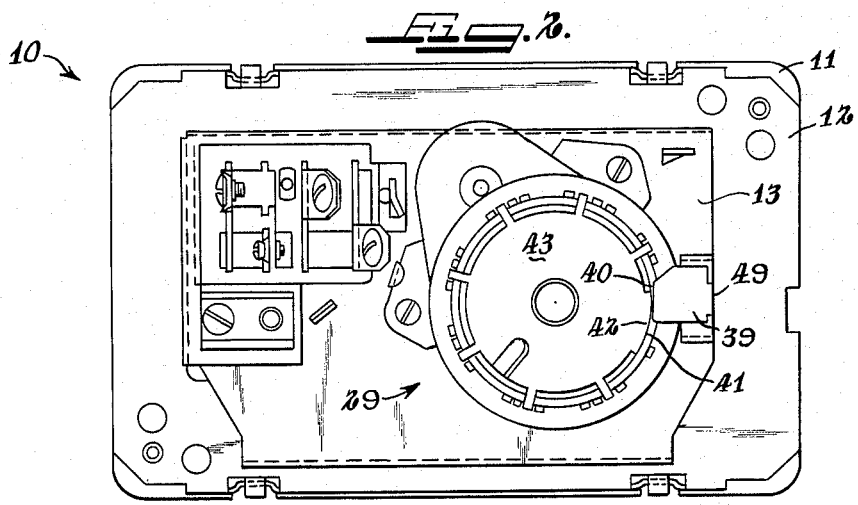
FIG. 2 is a view, in rear elevation, of the range timer shown in FIG. 1, the cover for the motor and the rotor having been removed and a portion of one of the shading rings broken away in order to illustrate more clearly certain details of construction.
Figure 3:
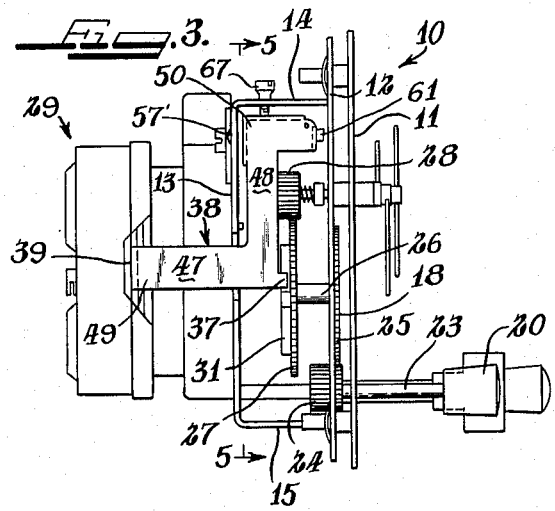
FIG. 3 is a view, in end elevation, looking from right to left of FIG. 2.

Referring now particularly to FIGS. 1, 2 and 3 of the drawings, it will be observed that the reference character 10 designates, generally, a range timer of the kind and character disclosed in the second patent above referred to. Insofar as pertinent the disclosure of that patent is incorporated herein by reference and only so much of the mechanism there disclosed is described herein to provide an understanding of the present invention.

The range timer 10 includes a dial plate 11 which has secured to the rear side thereof a front frame plate 12 that, in turn, has secured thereto in spaced relation a rear frame plate 13 having integral upper and lower walls 14 and 15 which extend toward the rear side of the front frame plate 12.

The range timer 10 includes an interval timer, indicated generally at 16 in FIG. 1, that is employed for controlling the operation of an audible signal provided by a buzzer member, constructed as disclosed herein, for the purpose of indicating the end of a preset interval which is less than sixty minutes. In order to observe the indicating portion of the interval timer 16 a window 17 is provided in the dial plate 11 to permit observation of a dial 18 which carries a scale 19 along its periphery that is graduated in minutes. A set knob 20, below the window 17, is employed for presetting the dial 18 to the desired time at the end of which the buzzer is to be sounded.

Referring now to FIG. 3, it will be noted that the set knob 20 is mounted on the outer end of a shaft 23 that extends through the dial plate 11 and front frame plate 12. Secured to the shaft 23 for rotation therewith is a pinion 24 that meshes with gear teeth 25 along the periphery of the dial 18. The dial 18 is mounted for rotation with a shaft 26 to which there is secured a gear 27, FIG. 5, that is arranged to be driven by a pinion 28. As described in the application above referred to, the pinion 28 is driven by a synchronous electric motor which is illustrated, generally, at 29 in FIGS. 2 and 3 and is mounted on the rear side of the rear frame plate 13. A section of the gear teeth along the periphery of the gear 27 is omitted as indicated at 30 in FIG. 5 in order to interrupt the driving connection to the pinion 28 when a cam 31, carried by and rotatable with the gear 27, occupies a position in which the buzzer member, to be described, is permitted to operate to give the audible signal. As shown here the cam 31 has along its periphery a shallow notch 32 between humps 33—33 and adjacent thereto is a deep notch 34.

Figure 4:
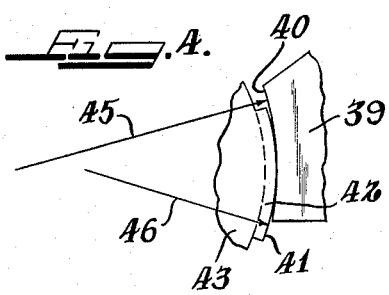
FIG. 4 is a view, at an enlarged scale, showing the relationship between the arcuate surface on the hammer and the juxtaposed arcuate surface on the hammer contacting part of the field plate.

The deep notch 34 along the periphery of the cam 31 is arranged to receive a sensing finger 37 when the cam 31 has been rotated together with the gear 27 by the timing pinion 28 to a position that corresponds to the end of the interval that has been set by the knob 20. The sensing finger 37 is an integral part of a buzzer member that is indicated, generally, at 38 and is shown in more detail in FIGS. 8 and 9. The buzzer member 38, as shown in FIG. 3, is generally L-shaped and is formed of magnetic material such as nickel plated tempered cold rolled steel. A hammer 39 forms an integral part of the buzzer member 38 and it has an arcuate surface 40 for engaging an arcuate surface 41 of a hammer contacting part 42 that constitutes an integral lateral extension of a magnetic field plate 43 which is a part of the magnetic field structure of the synchronous electric motor 29 as shown in FIG. 2. FIG. 4 shows the juxtaposed portions of the hammer 39 and hammer contacting part 42 at an enlarged scale. Here it will be observed that the radius of the arcuate surface 40 is indicated at 45 and that this radius is somewhat greater than the radius 46 of the arcuate surface 41 on the outer side of the hammer contacting part 42. The radii 45 and 46 are proportioned in the manner indicated in order to limit the area of contact engagement between the surfaces 40 and 41 to the end that the air gap therebetween can be adjusted readily in a manner to be described so that consistent operation of the buzzer member 38 will result when the range timers 10 are manufactured on a production basis. This arrangement insures uniformity of the audible signal that is provided by the buzzer member 38 when it is permitted to operate.

As pointed out, the buzzer member 38 is of L-shape. It comprises legs 47 and 48 which are flat and which extend, as indicated in FIG. 3, at right angles to each other. The hammer 39 constitutes an integral extension of the outer end 49 of the leg 47 which extends at right angles thereto. The hammer 39 is substantially wider than the leg 47 on which it is mounted.

The outer end of the leg 48 is indicated at 50 and it has a U-shaped yoke 51 formed integrally therewith. The yoke 51 includes arms 52 and 53, the latter being somewhat shorter than the former as will be clear from a consideration of FIGS. 8 and 9. The arm 52, which is located adjacent the inner surface of the rear frame plate 13, has an opening 54 that is arranged to receive a bearing portion 55 of a support stud, shown generally at 56 in FIG. 10, which has an end portion 57 below the bearing portion 55. As seen in FIG. 7, the end portion 57 extends through the rear frame plate 13 and is headed over as indicated at 57' for supporting the stud 56 in cantilever fashion. It is desirable that the pivot action of the buzzer member 38 be controlled principally by the bearing portion 55. Accordingly, its external diameter and the diameter of the opening 54 are so chosen that there is a relatively snug fit therebetween while permitting free relative rotation. For illustrative purposes it is pointed out that the opening 54 may have a diameter of 0.195" while the diameter of the bearing portion 55 is 0.1875". The support stud 56, which preferably is formed of steel screw stock, together with the rear frame plate 13 on which it is mounted, provides a relatively rigid pivotal support for the buzzer member 38.

The arm 53, which is slightly shorter than the arm 52 of the yoke 51, has a slotted opening 58 as seen in FIGS. 8 and 9. The slotted opening 58 is formed by a large diameter section 59 which intersects a small diameter section 60. The slotted opening 58 is arranged to receive a head 61 at the distal end of the support stud 56. Below the head 61 there is formed an annular groove 62 that cooperates with the small diameter section 60 when the buzzer member 38 is positioned properly on the support stud 56. There is a relatively loose fit between the bottom of the annular groove 62 and the small diameter section 60 of the slotted opening 58. For illustrative purposes it can be pointed out that the annular groove has a base diameter of 0.090" while the diameter of the small section 60 may be 0.096". With this arrangement the arm 53 is merely guided on the distal end of the support stud 56 and it is unnecessary to align a bearing section here with the bearing section provided by the opening 54 in the arm 52. This arrangement facilitates assembly of the buzzer member 38 and insures uniformity in its operation.

As seen in FIG. 3 of the drawings the head 61 at the distal end of the support stud 56 is spaced from the rear surface of the front frame plate 12. When this arrangement is employed, should there be a slight twisting action applied to the front and rear frame plates 12 and 13, the mounting of the buzzer member 38 on the rear frame plate 13 is unaffected since the support stud 56 is mounted solely on the rear frame plate 13. Hence the buzzer member 38 always is maintained in alignment with the rear frame plate 13.

With a view to biasing the sensing finger 37 into engagement with the peripheral surface of the cam 31 a spring wire 63 is employed. Its construction is shown in FIG. 11 and its application to the assembly is shown in FIG. 6. Here it will be observed that one end 64 of the spring wire 63, which is offset from the central portion, extends through a suitable opening in the upper wall 14 of the rear frame plate 13. The other end 65 of the spring wire, which is generally S-shaped, extends through a suitable opening in the outer end 50 of the leg 48. The other end 65 of the spring wire 63 reacts against the outer end 50 at a position above the plane of the longitudinal axis of the support stud 56. As a result the buzzer member 38, as viewed in FIG. 6, is biased for rotation in a counter-clockwise direction.

In order to adjust the air gap between the arcuate surfaces 40 and 41 to provide the desired volume of audible signal an adjusting tongue 66 is formed integrally with the leg 48 of the buzzer member 38 and it extends at right angles thereto from the outer end 50 at a position slightly beyond the yoke 51. Attention is directed to the fact that the adjusting tongue 66 underlies the upper wall 14. The position of the tongue 66 can be adjusted relative to the wall 14 and against the biasing action of the spring wire 63 by an adjusting screw 67. The adjusting screw 67 is threaded through the upper wall 14. After the adjustment has been completed, the screw 67 is suitably anchored to the upper wall 14 so that the adjustment cannot be changed once it has been set.

The buzzer member 38 is assembled in position on the support stud 56. Then the spring wire 63 is applied. Subsequently the rear frame plate 13 having the buzzer member 38 assembled thereon is mounted on the front frame plate 12 with the hammer 39 adjacent the hammer contacting part 42 of the magnetic field plate 43. With the sensing finger 37 occupying the position shown in FIG. 5 and in the deep notch 34, the synchronous motor 29 is energized. The adjusting screw 67 is then shifted to position the tongue 66 at the location which corresponds to the desired volume of audible signal that is caused by the repeated contacting of the hammer 39 with the hammer contacting part 42 of the magnetic field plate 43.

During the normal operation of the range timer 10, the cam 31 is rotated to such a position that the sensing finger 37 is located in the shallow notch 42. In this position of the buzzer member 38 the hammer 39 is held a substantial distance away from the hammer contacting part 42 and no audible signal is given. In order to set the interval timer 16, the set knob 20 is rotated to rotate the shaft 23 and the pinion 24 thereon. Since the pinion 24 engages the gear teeth 25 on the dial 18, the latter is rotated to move the scale 19 to the desired position relative to an index 68 on the dial plate 11. Rotation of the dial 18 is accompanied by rotation of the shaft 26 and gear 27. The section 30 from which the gear teeth on the gear 27 are omitted is moved out of registry with the pinion 28 and the latter then is placed in driving engagement with the gear 27. The rotation of the set knob 20 is accompanied by rotation of the cam 31 and its surface is engaged by the distal end of the sensing finger 37 to sensing finger 37 is an integral part of a buzzer member that is indicated, generally, at 38 and is shown in more detail in FIGS. 8 and 9 of the drawings. The buzzer member 38, as shown in FIG. 3, is generally L-shaped and is formed of magnetic material such as nickel plated tempered cold rolled steel. A hammer 39 forms an integral part of the buzzer member 38 and it has an arcuate surface 40 for engaging an arcuate surface 41 of a hammer contacting part 42 that constitutes an integral lateral extension of a magnetic field plate 43 which is a part of the magnetic field structure of the synchronous electric motor 29 as shown in FIG. 2. FIG. 4 shows the juxtaposed portions of the hammer 39 and hammer contacting part 42 at an enlarged scale. Here it will be observed that the radius of the arcuate surface 40 is indicated at 45 and that this radius is somewhat greater than the radius 46 of the arcuate surface 41 on the outer side of the hammer contacting part 42. The radii 45 and 46 are proportioned in the manner indicated in order to limit the area of contact engagement between the surfaces 40 and 41 to the end that the air gap therebetween can be adjusted readily in a manner to be described so that consistent operation of the buzzer member 38 will result when the range timers 10 are manufactured on a production basis. This arrangement insures uniformity of the audible signal that is provided by the buzzer member 38 when it is permitted to operate.

As pointed out, the buzzer member 38 is of L-shape. It comprises legs 47 and 48 which are flat and which extend, as indicated in FIG. 3, at right angles to each other. The hammer 39 constitutes an integral extension of the outer end 49 of the leg 47 which extends at right angles thereto. The hammer 39 is substantially wider than the leg 47 on which it is mounted.

The outer end of the leg 48 is indicated at 50 and it has a U-shaped yoke 51 formed integrally therewith. The yoke 51 includes arms 52 and 53, the latter being somewhat shorter than the former as will be clear from a consideration of FIGS. 8 and 9. The arm 52, which is located adjacent the inner surface of the rear frame plate 13, has an opening 54 that is arranged to receive a bearing portion 55 of a support stud, shown generally at 56 in FIG. 10, which has an end portion 57 below the bearing portion 55. As seen in FIG. 7, the end portion 57 extends through the rear frame plate 13 and is headed over as indicated at 57' for supporting the stud 56 in cantilever fashion. It is desirable that the pivot action of the buzzer member 38 be controlled principally by the bearing portion 55. Accordingly, its external diameter and the diameter of the opening 54 are so chosen that there is a relatively snug fit therebetween while permitting free relative rotation. For illustrative purposes it is pointed out that the opening 54 may have a diameter of 0.195" while the diameter of the bearing portion 55 is 0.1875". The support stud 56, which preferably is formed of steel screw stock, together with the rear frame plate 13 on which it is mounted, provides a relatively rigid pivotal support for the buzzer member 38.

The arm 53, which is slightly shorter than the arm 52 of the yoke 51, has a slotted opening 58 as seen in FIGS. 8 and 9. The slotted opening 58 is formed by a large diameter section 59 which intersects a small diameter section 60. The slotted opening 58 is arranged to receive a head 61 at the distal end of the support stud 56. Below the head 61 there is formed an annular groove 62 that cooperates with the small diameter section 60 when the buzzer member 38 is positioned properly on the support stud 56. There is a relatively loose fit between the bottom of the annular groove 62 and the small diameter section 60 of the slotted opening 58. For illustrative purposes it can be pointed out that the annular groove has a base diameter of 0.090" while the diameter of the small section 60 may be 0.096". With this arrangement the arm 53 is merely guided on the distal end of the support stud 56 and it is unnecessary to align a bearing section here with the bearing section provided by the opening 54 in the arm 52. This arrangement facilitate assembly of the buzzer member 38 and insures uniformit in its operation.

As seen in FIG. 3 of the drawings the head 61 at th distal end of the support stud 56 is spaced from the rea surface of the front frame plate 12. When this arrange ment is employed, should there be a slight twisting actio applied to the front and rear frame plates 12 and 13, th mounting of the buzzer member 38 on the rear fram plate 13 is unaffected since the support stud 56 is mounte solely on the rear frame plate 13. Hence the buzze member 38 always is maintained in alignment with th rear frame plate 13.

With a view to biasing the sensing finger 37 into engag ment with the peripheral surface of the cam 31 a sprin wire 63 is employed. Its construction is shown in FIG. 1 and its application to the assembly is shown in FIG. Here it will be observed that one end 64 of the sprin wire 63, which is offset from the central portion, extent through a suitable opening in the upper wall 14 of th rear frame plate 13. The other end 65 of the spring wir which is generally S-shaped, extends through a suitabl opening in the outer end 50 of the leg 48. The othe end 65 of the spring wire 63 reacts against the outer en 50 at a position above the plane of the longitudinal ax of the support stud 56. As a result the buzzer membe 38, as viewed in FIG. 6, is biased for rotation in a counte clockwise direction.

In order to adjust the air gap between the arcuat surfaces 40 and 41 to provide the desired volume of au dible signal an adjusting tongue 66 is formed integrall with the leg 48 of the buzzer member 38 and it extends right angles thereto from the outer end 50 at a positic slightly beyond the yoke 51. Attention is directed to t fact that the adjusting tongue 66 underlies the upper wa 14. The position of the tongue 66 can be adjusted rel tive to the wall 14 and against the biasing action of th spring wire 63 by an adjusting screw 67. The adjustir screw 67 is threaded through the upper wall 14. After t adjustment has been completed, the screw 67 is suitab anchored to the upper wall 14 so that the adjustment ca not be changed once it has been set.

The buzzer member 38 is assembled in position on t support stud 56. Then the spring wire 63 is applie Subsequently the rear frame plate 13 having the buzz member 38 assembled thereon is mounted on the fro frame plate 12 with the hammer 39 adjacent the hamm contacting part 42 of the magnetic field plate 43. Wi the sensing finger 37 occupying the position shown FIG. 5 and in the deep notch 34, the synchronous mot 29 is energized. The adjusting screw 67 is then shift to position the tongue 66 at the location which corr sponds to the desired volume of audible signal that caused by the repeated contacting of the hammer 39 wi the hammer contacting part 42 of the magnetic fie plate 43.

During the normal operation of the range timer 1 the cam 31 is rotated to such a position that the sensi finger 37 is located in the shallow notch 42. In t position of the buzzer member 38 the hammer 39 is he a substantial distance away from the hammer contacti part 42 and no audible signal is given. In order to s the interval timer 16, the set knob 20 is rotated to rota the shaft 23 and the pinion 24 thereon. Since the pini 24 engages the gear teeth 25 on the dial 18, the latter rotated to move the scale 19 to the desired position rel tive to an index 68 on the dial plate 11. Rotation of t dial 18 is accompanied by rotation of the shaft 26 a gear 27. The section 30 from which the gear teeth on t gear 27 are omitted is moved out of registry with t pinion 28 and the latter then is placed in driving engag ment with the gear 27. The rotation of the set knob is accompanied by rotation of the cam 31 and its surfa is engaged by the distal end of the sensing finger 37 continue to hold the hammer 39 out of operative position with respect to the hammer contacting part 42. The continued rotation of the timer pinion 28 by the motor 29 finally rotates the cam 31 to such a position that the deep notch 34 registers with the sensing finger 37. The buzzer member 38 then rotates on the bearing portion 55 of the support stud 56 under the influence of the spring wire 63 and the hammer 39 is moved toward the hammer contacting part 42 of the magnetic field plate 43. The hammer 39 now is subjected to the influence of the alternating magnetic field of the synchronous motor 29 and it is vibrated accordingly into and out of engagement with the arcuate surface 41 of the hammer contacting part 42. In this position of the cam 31, the timing pinion 28 no longer is in driving engagement with the teeth of the gear 27 since, as shown in FIG. 5, the section 30 where the gear teeth have been omitted is opposite the pinion 28. In order to shut off the action of the buzzer member 38, the set knob 20 is rotated to cause the sensing finger 37 to ride out of the deep notch 34 and over the adjacent hump 33. The sensing finger 37 comes to rest at the bottom of the shallow notch 32 with the arrangement being such that further rotation of the set knob 20 is prevented.

Tests have indicated that, when the buzzer member 38 is constructed as described herein and is pivoted on the support stud 56 in the manner described, there is substantially no wear on the pivot mounting. Consistent operation of the buzzer member 38 over a relatively long period is assured.

What is claimed as new is:

1. For combination with a magnetic field structure of an electric motor energized by alternating current and having a hammer contacting part, a buzzer construction comprising front and rear frame plates in parallel spaced relation, said rear frame plate having said motor mounted thereon with said hammer contacting part spaced rearwardly of said rear frame plate, a support stud secured at one end to one of said frame plates and extending toward the other frame plate; and a buzzer member of magnetic material of generally L-shape having a hammer at the outer end of one leg extending at right angles thereto toward said hammer contacting part to engage the same to generate an audible signal, and a U-shaped yoke at the outer end of the other leg with the arms extending at right angles thereto parallel to and between said frame plates with the arm of said yoke adjacent the frame plate to which said stud is secured being journaled thereon and the other arm of said yoke being guided on the distal end of said stud.

2. For combination with a magnetic field structure of an electric motor energized by alternating current and having a hammer contacting part, a buzzer construction comprising front and rear frame plates in parallel spaced relation, said rear frame plate having said motor mounted thereon with said hammer contacting part spaced rearwardly of said rear frame plate, a support stud secured at one end to one of said frame plates and extending toward the other frame plate and having an annular groove adjacent its distal end; and a buzzer member of magnetic material of generally L-shape having a hammer at the outer end of one leg extending at right angles thereto toward said hammer contacting part to engage the same to generate an audible signal, and a U-shaped yoke at the outer end of the other leg with the arms extending at right angles thereto parallel to and between said frame plates with the arm of said yoke adjacent the frame plate to which said stud is secured being journaled thereon providing the principal bearing for said buzzer member and the other arm of said yoke having a slot the sides of which extend into said annular groove at said distal end of said support stud to guide said other arm and thereby said U-shaped yoke on said support stud.

3. For combination with a magnetic field structure of an electric motor energized by alternating current and having a hammer contacting part, a buzzer construction comprising front and rear frame plates in parallel spa relation, said rear frame plate having said motor mou thereon with said hammer contacting part spaced r wardly of said rear frame plate, a support stud sect at one end to said rear frame plate and extending tow said front frame plate; a buzzer member of magn material of generally L-shape having a hammer at outer end of one leg extending at right angles thereto ward said hammer contacting part to engage the sam generate an audible signal, and a U-shaped yoke at outer end of the other leg with the arms extending right angles thereto parallel to and between said fr plates with the arm of said yoke adjacent said rear fr plate being journaled thereon and the other arm of yoke being guided on the distal end of said stud; a extending from said rear frame plate toward said fr frame plate, a tongue extending from and at right an to said outer end of said other leg and underlying wall, and stop means carried by said wall and extenc toward said tongue to limit the movement of said bu member about said stud.

4. A buzzer construction comprising front and r frame plates, means mounting said frame plates in par: spaced relation, a support stud secured at one end to of said frame plates and extending toward and spa from the other frame plate; and a buzzer member of n netic material of generally L-shape having a hammer the outer end of one leg extending at right angles ther and a U-shaped yoke at the outer end of the other with the arms extending at right angles to said other and parallel to and between said frame plates with arm of said yoke adjacent the frame plate to which stud is secured having a journal opening fitting clo: with said stud and providing the principal bearing for buzzer member and the other arm of said yoke havin clearance opening and being guided on the distal enc said stud.

5. A buzzer construction comprising front and r frame plates, means mounting said frame plates in par: spaced relation, a support stud secured at one end to of said frame plates and extending toward and spa from the other frame plate and having an annular gro adjacent its distal end; and a buzzer member of magn material of generally L-shape having a hammer at outer end of one leg extending at right angles thereto, a U-shaped yoke at the outer end of the other leg with arms extending at right angles to said other leg and allel to and between said frame plates with the arm said yoke adjacent the frame plate to which said stu secured having a journal opening fitting closely with stud and providing the principal bearing for said bu member and the other arm of said yoke having a slot sides of which extend into said annular groove at distal end of said support stud to guide said other and thereby said U-shaped yoke on said support stud.

6. A buzzer construction comprising front and r frame plates, means mounting said frame plates in p allel spaced relation, a support stud secured at one en said rear frame plate and extending toward and spa from said front frame plate; a buzzer member of n netic material of generally L-shape having a hammer the outer end of one leg extending at right angles ther and a U-shaped yoke at the outer end of the other leg v the arms extending at right angles to said other leg parallel to and between said frame plates with the arm said yoke adjacent said rear frame plate having a jour opening fitting closely with said stud and providing principal bearing for said buzzer member and the ot arm of said yoke having a clearance opening and be guided on the distal end of said stud; a wall extend from said rear frame plate toward said front frame pl a tongue extending from and at right angles to said o end of said other leg and underlying said wall, and s means carried by said wall and extending toward s tongue to limit the movement of said buzzer member about said stud.

References Cited by the Examiner
UNITED STATES PATENTS

| | | | |
|---|---|---|---|
| 2,002,421 | 5/1935 | Tisseyre et al. | 58—38 |
| 2,002,433 | 5/1935 | Cowles | 58—38 |
| 2,008,105 | 7/1935 | Lawrence et al. | 58—26 |
| 2,027,531 | 1/1936 | Hammond | 58— |
| 2,542,947 | 2/1951 | Rowe | 200— |
| 2,844,767 | 7/1958 | Houdek | 317—1 |

NEIL C. READ, *Primary Examiner.*

W. C. GLEICHMAN, T. A. ROBINSON,
*Assistant Examiners.*